Dec. 13, 1938.  J. L. DRAKE  2,140,282
APPARATUS FOR TEMPERING GLASS
Filed Dec. 26, 1935  2 Sheets—Sheet 1
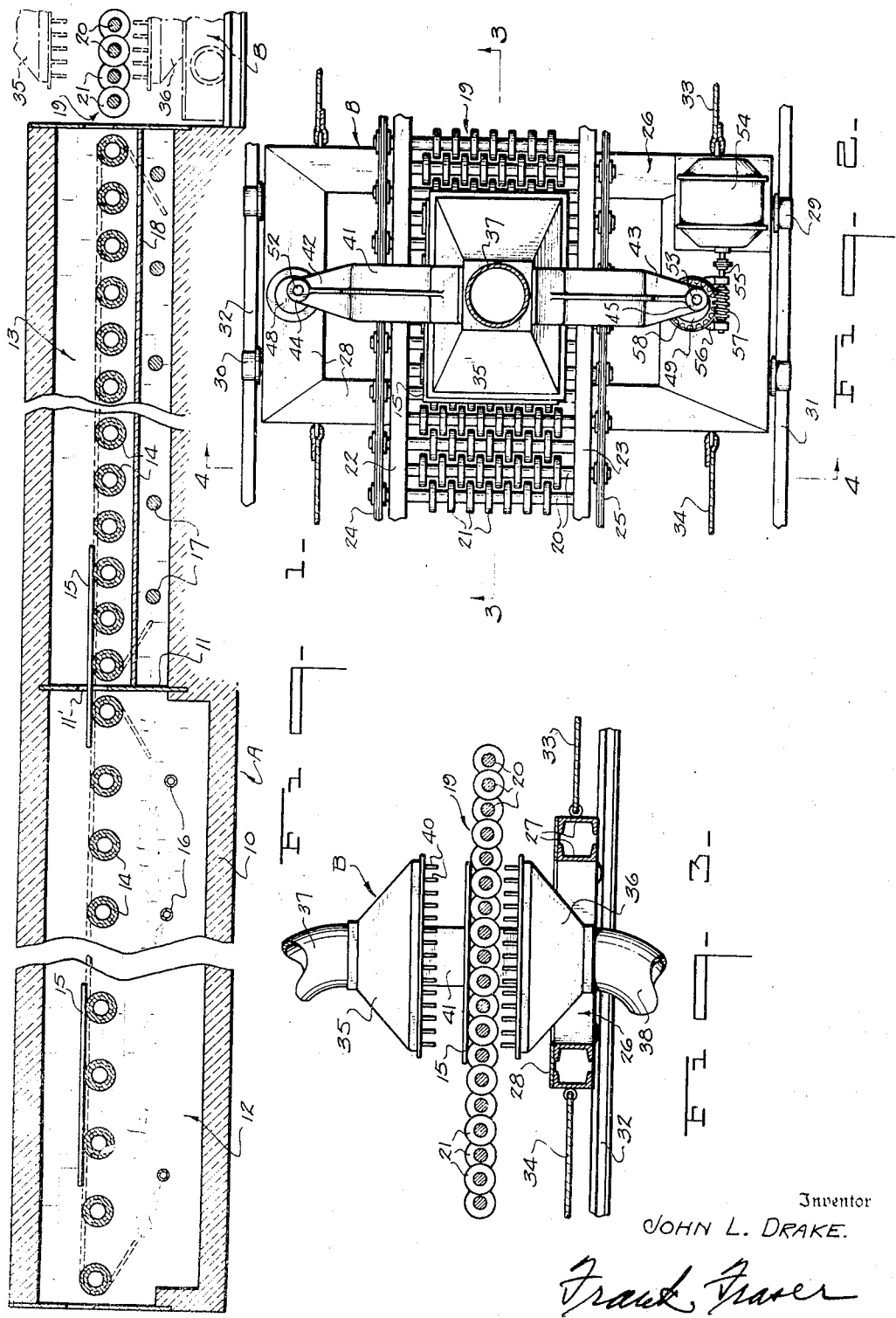
Inventor
JOHN L. DRAKE.
Frank Fraser
Attorney Dec. 13, 1938.  J. L. DRAKE  2,140,282
APPARATUS FOR TEMPERING GLASS
Filed Dec. 26, 1935  2 Sheets-Sheet 2

Inventor
JOHN L. DRAKE.

Frank Fraser
By
Attorney

Patented Dec. 13, 1938

2,140,282

UNITED STATES PATENT OFFICE 2,140,282

APPARATUS FOR TEMPERING GLASS

John L. Drake, Toledo, Ohio, assignor to Libbey-Owens-Ford Glass Company, Toledo, Ohio, a corporation of Ohio Application December 26, 1935, Serial No. 56,172

11 Claims. (Cl. 49—45)

The present invention relates broadly to the art of tempering and more particularly to improvements in apparatus for use in the tempering of flat sheets or plates of glass.

When tempering glass sheets according to one known process, the sheets are first heated to approximately the point of softening of the glass and then suddenly chilled to place the outer surfaces of said sheets under compression and the interiors thereof under tension. The treatment of glass sheets in this manner not only materially increases the mechanical strength of the glass but further modifies its breaking characteristics in that, when broken, the glass sheet will disintegrate into innumerable small and relatively harmless particles instead of breaking into large dangerous pieces or slivers as is the case with ordinary glass.

In the practice of the above process, the glass sheet is ordinarily maintained in a vertical position during the treatment thereof, and it is customary to suspend the sheet from a plurality of relatively small tongs or hooks which engage the same near its upper edge. The glass sheet is first heated to the desired temperature within a suitable furnace and upon removal therefrom is subjected immediately to the action of suitable cooling devices by which the glass is suddenly chilled. These cooling devices usually comprise spaced blower heads between which the highly heated glass sheet is received and which serve to direct jets of air upon opposite surfaces of the said sheet simultaneously.

The suspending of the glass sheet in a vertical position by means of tongs is, however, not entirely satisfactory due to the fact that the tongs tend to bite into the glass sheet upon the softening thereof, causing slight indentations or depressions which remain in the glass after tempering and which tend to mar the appearance thereof. Further, if the glass sheet is not properly hung, it is very apt to become warped or distorted upon being heated to the point of softening of the glass. The marring of the glass sheet by the tongs would not be so objectionable were it possible to trim the sheet after tempering, but glass so tempered cannot be subsequently cut without causing the complete shattering thereof.

This invention, therefore, has for an object the provision of a novel form of tempering apparatus wherein the glass sheet is subjected to both the heating and cooling treatments while maintained in a horizontal or substantially horizontal position, and wherein the use of tongs or other supporting means which tend to mar the sheet is eliminated.

Another object of the invention is the provision of tempering apparatus wherein the glass sheet is maintained in substantially constant motion during the tempering operations whereby warping or distortion of the sheet upon softening thereof is reduced to a minimum.

Other objects and advantages of the invention will become more apparent during the course of the following description when taken in connection with the accompanying drawings.

In the drawings wherein like numerals are employed to designate like parts throughout the same, Fig. 1 is a vertical longitudinal sectional view through the furnace employed for heating the glass sheets, with a portion of the cooling means being shown to the right in broken lines;

Fig. 2 is a plan view of the cooling means;

Fig. 3 is a sectional view taken substantially on line 3—3 of Fig. 2;

Figure 4:
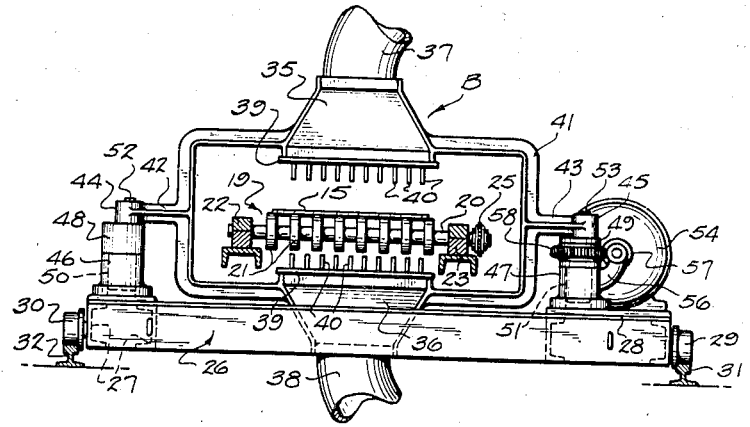
Fig. 4 is a sectional view taken substantially on line 4—4 of Fig. 2.

With reference first to Figs. 1 to 4 of the drawings, the letter A designates in its entirety the means for heating the glass sheets and B the means for subsequently cooling the same, the glass sheets being adapted to be passed directly from the heating means to the cooling means so that they will be immediately acted upon by the latter while still in a uniformly heated condition.

The heating means A comprises an elongated furnace structure 10 substantially rectangular in cross section and divided transversely at a point intermediate its ends by a vertical partition wall 11 into a primary heating section 12 and a final heating section 13. Arranged throughout the entire length of the furnace structure are a series of horizontally aligned conveyor rolls 14 for supporting the glass sheets 15 to be tempered, said rolls being positively driven in any desired manner to advance the glass sheets through the furnace at a predetermined rate of speed, with the sheets passing from the primary heating section into the final heating section through a slot 11' in partition wall 11.

The primary heating section 12 of the furnace, which is here shown as being of relatively larger cross sections than the final heating section 13, is preferably heated with gas supplied thereto through burners 16, while the final heating section is preferably electrically heated by means of electrical heating elements 17. These elements or resistors may be connected in series or parallel and may be controlled in the usual manner by necessary switches and rheostats. A horizontal baffle wall 18 may be arranged above the electrical heating elements 17 to provide a muffle type heating arrangement.

In the tempering of the glass sheets, they are, as stated above, heated to approximately the point of softening of the glass which is ordinarily in the neighborhood of 1250° F. for flat glass, and the sheets are adapted to be gradually brought to this temperature during their travel through the furnace 10. There is a decided advantage to be gained in dividing the furnace into a primary heating section and a final heating section and in heating the former with gas and the latter by electricity. Thus, it is well known that gas is a relatively cheaper fuel than electricity, and therefore the cheap fuel is used for the primary heating of the glass while the more expensive electric heat is used only for the final finishing heat. The glass sheets may be heated as they travel through the primary heating section 12 to approximately 1000 to 1100 degrees Fahrenheit, and in their passage through the final heating section may be brought from this temperature to a temperature of 1250° F. While gas is cheaper than electricity, yet it is also a well known fact that electricity produces a more uniform and constant heat than any of the other forms of heating. Consequently, during their travel through the final heating section, the glass sheets will be evenly and uniformly heated to the desired predetermined temperature. The conveying rolls 14 within the final heating section 13 are preferably arranged relatively closer together than the rolls in the primary heating section 12 so as to prevent sagging of the softened glass therebetween.

As the highly heated glass sheet emerges from the exit end of the furnace, it is received upon a roller conveyor or runway 19 which comprises a series of horizontal shafts 20, each carrying a plurality of spaced, short cylindrical discs 21, with the discs on one shaft moving in the spaces between the discs on the adjacent shafts. In this way, each adjacent pair of shafts 20 may be brought more closely together and the length of the unsupported stretch of glass sheet between adjacent discs considerably diminished. The sheet, when received upon the runway 19, is in a relatively softened condition, and the spacing of the discs is such as to minimize the tendency of the sheet to sag therebetween. The shafts 20 are journaled at their opposite ends in bearings 22 and 23, with every other shaft 20 projecting beyond the bearing 22 and being driven by a chain and sprocket drive 24, while the remaining shafts extend beyond the bearing 23 and are driven by a chain and sprocket drive 25. The chain and sprocket drives 24 and 25 are of course equalized so that all of the shafts 20 are driven at the same speed.

The cooling means B is associated with the runway 19 and is mounted for movement with the glass sheet along said runway. The cooling means includes a supporting carriage 26 disposed beneath the runway and comprising a substantially rectangular frame made up of pairs of channel members 27 upon which are secured plates 28. The carriage 26 is provided at its opposite ends with wheels 29 and 30 which roll along upon rails 31 and 32 respectively, being propelled in one direction by cables 33 and in the opposite direction by cables 34.

The cooling devices proper consist of superimposed blower heads 35 and 36 arranged respectively above and beneath the runway 19 and being connected by flexible conduits 37 and 38 to suitable blower apparatus. The inner ends of the blower heads 35 and 36 are covered by plates 39 provided with a plurality of nipples 40 through which jets of air are directed simultaneously against opposite surfaces of the glass sheet 15 as the said sheet is carried along the runway.

The blower heads 35 and 36 are carried by a rectangular frame 41 encircling the runway 19 and provided at its opposite ends with outwardly projecting horizontally aligned arms 42 and 43 terminating at their outer ends in bearings 44 and 45 respectively. Carried at opposite ends of the carriage 26 are upright bearings 46 and 47 upon which are supported cranks 48 and 49 respectively provided with depending stub shafts 50 and 51 journaled in the bearings 46 and 47. The cranks 48 and 49 are also provided at their upper ends with vertical pins 52 and 53 which are offset from the axes of rotation of the shafts 50 and 51 and which are adapted to receive thereon the bearings 44 and 45.

One of the cranks 48 or 49, and as here shown crank 49, is adapted to be positively driven to effect oscillatory movement of the frame 41 and blower heads 35 and 36 carried thereby. This may be accomplished by means of a motor 54 driving a shaft 55 rotatably supported by the substantially U-shaped bracket 56 and having keyed thereto a worm 57 meshing with a worm gear 58 keyed to crank 49.

In operation, the cooling means B is first moved along the rails 31 and 32 to a position closely adjacent the exit end of the furnace 10 as indicated by the broken lines in Fig. 1. As the highly heated glass sheet 15 emerges from the furnace onto the runway 19, the blower heads 35 and 36 are adapted to direct a plurality of jets of air simultaneously upon opposite surfaces of the said sheet. During the cooling of the glass sheet, the said sheet will be carried forwardly and during this time the blower heads are also adapted to travel forwardly with the sheet. As the blower heads are moved forwardly with the sheet, they are adapted to be simultaneously oscillated in the plane of the sheet to effect a more even and uniform treatment thereof. The spacing of the discs 21 of the runway 19 is such as to permit the air from blower head 36 to pass upwardly between the said discs and impinge upon the bottom surface of the sheet. It will be apparent that by maintaining the glass sheet in substantially constant motion, the liability of the said sheet becoming warped or distorted is reduced to a minimum. Also, that with the apparatus disclosed, the glass sheet is maintained in a horizontal position during both the heating and cooling thereof and that the use of tongs or other supporting means which tend to mar or disfigure the sheet is eliminated.

Figure 5:
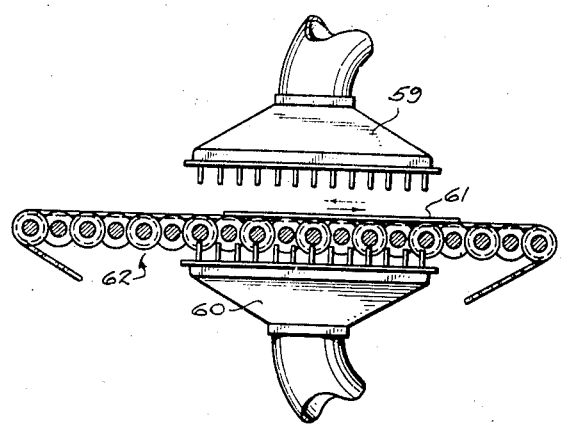
Fig. 5 is a view similar to Fig. 3 but showing an alternative arrangement.

In the arrangement illustrated in Fig. 5 of the drawings, the blower heads 59 and 60 are mounted in a relatively fixed position in that they do not move with the glass sheet 61. On the other hand, in this case, the glass sheet is moved back and forth upon the roller runway 62 during the cooling operation, as indicated by the arrows, whereby the said sheet is kept in constant motion and prevented from sagging or warping. The roller runway 62 may be and preferably is of the same construction as runway 19 described hereinabove.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for use in the tempering of sheet glass wherein the sheet is first heated to substantially the point of softening of the glass and then suddenly cooled, means for supporting and carrying the heated sheet forwardly, blower heads disposed at opposite sides of the path of travel of said sheet for directing blasts of air upon opposite surfaces thereof, and means for moving said blower heads in unison with the said sheet for cooling the same during the travel thereof.

2. In apparatus for use in the tempering of sheet glass wherein the sheet is first heated to substantially the point of softening of the glass and then suddenly cooled, means for supporting and carrying the heated sheet forwardly, means movable with the sheet for cooling the same during the travel thereof, and means for oscillating said cooling means during the travel thereof with the sheet.

3. In apparatus for use in the tempering of sheet glass wherein the sheet is first heated to substantially the point of softening of the glass and then suddenly cooled, means for supporting and carrying the heated sheet forwardly, blower heads disposed at opposite sides of the path of travel of said sheet for directing blasts of air upon opposite surfaces thereof, means for moving said blower heads in unison with the said sheet for cooling the same during the travel thereof, and means for oscillating said blower heads as a unit during the travel thereof with the sheet.

4. In apparatus for use in the tempering of sheet glass wherein the sheet is first heated to substantially the point of softening of the glass and then suddenly cooled, means for supporting and conveying the heated sheet horizontally, superimposed blower heads positioned above and beneath the sheet for directing blasts of air upon opposite surfaces thereof, and means for moving said blower heads in unison with the sheet for cooling the same during the travel thereof.

5. In apparatus for use in the tempering of sheet glass wherein the sheet is first heated to substantially the point of softening of the glass and then suddenly cooled, means for supporting and conveying the heated sheet horizontally, means moving horizontally with the sheet for cooling the same during the travel thereof, and means for oscillating said cooling means during the travel thereof with the sheet.

6. In apparatus for use in the tempering of sheet glass wherein the sheet is first heated to substantially the point of softening of the glass and then suddenly cooled, means for supporting and conveying the heated sheet horizontally, superimposed blower heads positioned above and beneath the sheet for directing blasts of air upon opposite surfaces thereof, means for moving said blower heads in unison with the sheet for cooling the same during the travel thereof, and means for oscillating said blower heads as a unit during the travel thereof with the sheet.

7. In apparatus for use in the tempering of sheet glass wherein the sheet is first heated to substantially the point of softening of the glass and then suddenly cooled, a roller conveyor for supporting and conveying the heated sheet horizontally, and means for cooling the sheet during the travel thereof including a carriage mounted beneath said conveyor and movable with the sheet, a frame carried by said carriage, and cooling elements carried by said frame and acting upon opposite surfaces of the glass sheet for cooling the same during the travel thereof.

8. In apparatus for use in the tempering of sheet glass wherein the sheet is first heated to substantially the point of softening of the glass and then suddenly cooled, a roller conveyor for supporting and conveying the heated sheet horizontally, and means for cooling the sheet during the travel thereof including a carriage mounted beneath said conveyor and movable with the sheet, a frame carried by said carriage, cooling elements carried by said frame and acting upon opposite surfaces of the glass sheet for cooling the same during the travel thereof, and means for oscillating said frame and the cooling elements carried thereby including a motor mounted upon said carriage and drive connections between said motor and frame.

9. In apparatus for use in the tempering of sheet glass wherein the sheet is first heated to substantially the point of softening of the glass and then suddenly cooled, a roller conveyor for supporting and conveying the heated sheet horizontally, superimposed blower heads positioned above and beneath said roller conveyor for directing blasts of air upon opposite surfaces of the sheet to cool the same, and means for reciprocating said sheet upon said roller conveyor.

10. In apparatus for use in the tempering of sheet glass, wherein the sheet is first heated to substantially the point of softening of the glass and then suddenly cooled, means for supporting and carrying the heated sheet forwardly, cooling devices disposed at opposite sides of the path of travel of said sheet for cooling the opposite surfaces thereof, and means for moving said cooling devices bodily with the said sheet to cool the same during the travel thereof.

11. In apparatus for use in the tempering of sheet glass, wherein the sheet is first heated to substantially the point of softening of the glass and then suddenly cooled, means for supporting and carrying the heated sheet forwardly, cooling devices disposed at opposite sides of the path of travel of said sheet for cooling the opposite surfaces thereof, means for mounting said cooling devices for bodily movement in the plane of travel of said sheet, and means for moving the said cooling devices with the said sheet to cool the same during the travel thereof.

JOHN L. DRAKE.